(12) United States Patent
Endo et al.

(10) Patent No.: US 7,541,591 B2
(45) Date of Patent: Jun. 2, 2009

(54) RADIATION IMAGING APPARATUS, SYSTEM AND METHOD AS WELL AS PROGRAM

(75) Inventors: Tadao Endo, Honjo (JP); Toshio Kameshima, Kumagaya (JP); Tomoyuki Yagi, Honjo (JP); Katsuro Takenaka, Saitama-ken (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 11/563,806

(22) Filed: Nov. 28, 2006

(65) Prior Publication Data
US 2007/0125952 A1    Jun. 7, 2007

(30) Foreign Application Priority Data
Dec. 2, 2005    (JP)    ............................. 2005-349879

(51) Int. Cl.
*G01T 1/20*    (2006.01)
(52) U.S. Cl. .................................. 250/369; 250/370.11
(58) Field of Classification Search ................. 250/369, 250/370.09, 370.14; 378/98.8
See application file for complete search history.

(56) References Cited

U.S. PATENT DOCUMENTS

| | | | | |
|---|---|---|---|---|
| 5,852,296 | A * | 12/1998 | Tsukamoto et al. ..... | 250/370.09 |
| 6,952,015 | B2 | 10/2005 | Kameshima ............ | 250/370.11 |
| 6,952,464 | B2 | 10/2005 | Endo ....................... | 378/98.11 |
| 6,985,555 | B2 | 1/2006 | Endo ....................... | 378/98.11 |
| 6,999,121 | B2 | 2/2006 | Endo et al. ................ | 348/297 |
| 7,002,157 | B2 | 2/2006 | Kameshima ............ | 250/370.11 |
| 7,012,260 | B2 | 3/2006 | Endo ....................... | 250/370.11 |
| 7,138,639 | B2 | 11/2006 | Kameshima ............ | 250/370.11 |
| 7,154,099 | B2 | 12/2006 | Endo ....................... | 250/370.11 |
| 7,227,926 | B2 | 6/2007 | Kameshima et al. ........ | 378/98.9 |
| 2002/0050568 | A1 * | 5/2002 | Nonaka ................... | 250/370.09 |
| 2005/0109927 | A1 | 5/2005 | Takenaka et al. .......... | 250/252.1 |
| 2005/0199834 | A1 | 9/2005 | Takenaka et al. ............ | 250/580 |
| 2005/0200720 | A1 | 9/2005 | Kameshima et al. ...... | 348/220.1 |
| 2005/0220269 | A1 | 10/2005 | Endo et al. .................. | 378/114 |
| 2005/0264665 | A1 | 12/2005 | Endo et al. .................. | 348/308 |
| 2006/0119719 | A1 | 6/2006 | Kameshima ................ | 348/308 |
| 2006/0192130 | A1 | 8/2006 | Yagi ....................... | 250/370.14 |
| 2006/0289774 | A1 | 12/2006 | Endo et al. ............. | 250/370.09 |
| 2007/0040099 | A1 | 2/2007 | Yokoyama et al. ....... | 250/208.1 |

(Continued)

*Primary Examiner*—David P Porta
*Assistant Examiner*—Faye Boosalis
(74) *Attorney, Agent, or Firm*—Fitzpatrick, Cella, Harper & Scinto

(57) ABSTRACT

An object hereof is to restrain occurrence of artifact in an acquired radiation image with comparatively simple configuration without providing wiring between a radiation source and a radiation imaging apparatus to thereby obtain a radiation image with extremely good quality. Therefore, a controller selectively carries out real read operation of reading an electric signal obtained by activating a drive circuit from a signal processing circuit unit in case of detecting X-ray irradiation with an X-ray detecting circuit and dummy read operation of reading an electric signal obtained by activating a drive circuit from a signal processing circuit unit in case of detecting X-ray non-irradiation with an X-ray detecting circuit; discontinues the dummy read operation at the time of detecting the start of X-ray irradiation with the X-ray detecting unit in dummy read operation; and starts real read operation at the time of detecting the finish of X-ray irradiation with the X-ray detecting unit.

10 Claims, 14 Drawing Sheets

U.S. PATENT DOCUMENTS

2007/0069144 A1 3/2007 Kameshima ........... 250/370.09
2007/0080299 A1 4/2007 Endo et al. ............. 250/370.09
2007/0096032 A1 5/2007 Yago et al. ............. 250/370.11
2007/0131843 A1 6/2007 Yokoyama et al. .......... 250/205
2007/0183573 A1 8/2007 Kameshima et al. ........ 378/98.9
2007/0210258 A1 9/2007 Endo et al. ............. 250/370.09

* cited by examiner

RADIATION IMAGING APPARATUS, SYSTEM AND METHOD AS WELL AS PROGRAM

BACKGROUND OF THE INVENTION

1. Field of the Invention

The present invention relates to a radiation imaging apparatus, a system and a method as well as a program preferable for use in medical diagnosis and industrial non-destructive inspection. As described herein, a radiation is intended to include electromagnetic waves such as X-rays and γ-rays, α-rays, and β-rays.

2. Description of the Related Art

Conventionally, an X-ray imaging system installed in a hospital and the like is divided into an analog system that irradiates a patient with an X-ray and irradiates film with the X-ray having penetrated a patient and a digital system that irradiates a patient with X-ray and converts an X-ray having penetrated a patient into an electric signal and accumulates it.

In FIG. 16, reference numeral 101 denotes an X-ray source of irradiating an X-ray; reference numeral 104 denotes an X-ray generator of generating X-rays outputted from the X-ray source 101; reference numeral 105 denotes a switch (an irradiation button) with which a radiologic technician and the like controls X-ray irradiation by opening and closing operation. Reference numeral 130 denotes an imaging device comprising a CCD imaging element of converting an X-ray having penetrated an object 102 being a patient and the like into an electric signal, an MOS imaging element or an imaging element in use of amorphous silicon, and the like. Reference numeral 103 denotes a phosphor of converting an X-ray having penetrated the object 102 into light such as visible light and the like. Moreover, a controller 140 is provided to control to drive the imaging unit 130 corresponding with a control signal transmitted in accordance with an opening/closing of the switch 105.

The case where the switch 105 is closed at random by the radiologic technician and the like is dealt with as follows in the X-ray imaging system shown in FIG. 16. That is, the control signal is transmitted from the X-ray generator 104 to the controller 140 to synchronize commencement of a drive of the imaging device 130 with an output of the X-ray to carry out temporal coordination.

However, in an X-ray imaging system of a conventional digital system, in order to transmit the control signal from the X-ray generator 104 to the controller 140 for synchronization, connection among them is implemented by wiring. This occasionally worsen imaging efficiency since such wiring is cumbersome and is not so easy to carry at the time of radiographing in case of use as a light and thin imaging device such as a cassette.

In addition, in the case where a manufacture of an X-ray generator is different from a manufacturer of an imaging device, an interface circuit is occasionally required in order to make it possible to transmit and receive the control signal. Moreover, after installation in a hospital, a case of replacing a used X-ray source with the one provided by another manufacturer, a case of repurchasing the X-ray source and the like give rise to problems described below. That is, since an interface occasionally becomes necessary newly in order to make it possible to transmit and receive control signals between the new X-ray source and a controller, it is indispensable to make a lot of interfaces ready for use.

In addition, it seems that a portable, light and thin cassette is convenient to make radiographing easy in space with a limited room inside an ambulance and the like, and a hospital with a narrow radiographing room and the like, for example. On this occasion, X-ray imaging system depriving electric wiring as much as possible deems to be desired.

Therefore, U.S. Pat. No. 6,999,121 discloses a method that makes it possible to radiograph an X-ray image without connecting an X-ray generator to an imaging device with electric wiring. As shown in FIG. 9 of U.S. Pat. No. 6,999,121, in that method, an imaging element transits to an accumulation mode in case of detecting commencement of X-ray irradiation during an idling period (a period from power activation to a panel to commencement of radiographing) required for stabilizing "real read operation" being first read operation of the imaging element. In case of detecting a conclusion of X-ray irradiation, "real read operation" is carried out. In addition, as shown in FIG. 10 of U.S. Pat. No. 6,999,121, X-ray irradiation frequently starts in the midst of "dummy read operation" being second read operation carried out a plurality of times during an idling period. In that case, information in "dummy read operation" after commencement of X-ray irradiation is also used as X-ray image information.

SUMMARY OF THE INVENTION

However, read data in the case where an X-ray is irradiated in the midst of "dummy read operation" gives rise to such a problem that leak phenomena through a switch take place to provide no accurate image signals since read operation is carried out in a state where light is irradiated onto a switch element. In particular, read data of "real read operation" read out after X-ray irradiation finishes are read in a state where no light is irradiated onto the switch element. Therefore, difference from the data in the above described "dummy read operation" arises, giving rise to such a problem that an artifact is cause to take place in an X-ray image obtained at last.

In addition, in case of using a photoelectric conversion element comprising amorphous material in particular, an imaging element has an optical response property. After X-ray irradiation finishes, ideally no current is desired to flow but actually a slight current flows and it is alleviated as time elapses. "Real read operation" after X-ray irradiation is desired to be carried out after the current is alleviated.

However, in U.S. Pat. No. 699,912, in case of starting X-ray irradiation in the midst of "dummy read operation", image data of the subsequent "dummy read operation" includes a current component due to the optical response. Therefore, the current component due to the optical response is different from the image data of "real read operation" after X-ray irradiation finishes, giving rise to such an artifact is cause to take place in an X-ray image obtained at last.

The present invention is attained in view of the above described problems and an object hereof is to provide a light and thin radiation imaging apparatus, a radiation imaging system and a radiation imaging method as well as a program making it possible to restrain occurrence of artifact in an acquired radiation image with comparatively simple configuration without providing wiring between a radiation source and a radiation imaging apparatus to thereby obtain a radiation image with extremely good quality.

A radiation imaging apparatus of the present invention comprises: a conversion unit for converting a radiation into an electric signal; a drive circuit unit for driving the above described conversion unit; a signal processing circuit unit for reading the above described electric signal from the above described conversion unit; a radiation detecting unit for detecting irradiation or non-irradiation of the above described radiation; and a controller for controlling operation of the above described drive circuit unit and operation of said signal processing circuit unit, wherein the above described controller; selectively carries out first read operation of reading an electric signal based on the above described radiation from the above described conversion unit and second read operation of reading an electric signal not based on the above described radiation from the above described conversion unit; and controls operation of said drive circuit unit and the above described signal processing circuit unit so as to be responsive to irradiation with the above described radiation in the above described radiation detecting unit to discontinue the above described second read operation and so as to be responsive to non-irradiation with the above described radiation in said radiation detecting unit to start the above described first read operation.

The radiation imaging system of the present invention comprises a radiation source and the above described radiation imaging apparatus for imaging based on radiation irradiated from the above described radiation source.

A method of controlling a radiation imaging apparatus of the present invention comprises: a first step of reading, prior to irradiation of radiation onto a converter of converting a radiation into an electric signal, an electric signal from the above described converter with a drive circuit unit for driving the above described converter and a signal processing circuit unit for reading the above described electric signal from the above described converter; a second step being responsive to irradiation with radiation in a radiation detecting unit for detecting irradiation or non-irradiation of radiation to discontinue the above described first step with the above described drive circuit unit and the above described signal processing circuit unit; and a third step being responsive to non-irradiation of the above described radiation in the above described radiation detecting unit to read an electric signal based on said radiation from the above described converter with the above described drive circuit unit and the above described signal processing circuit unit.

According to the present invention, it become possible to restrain occurrence of artifact in an acquired radiation image with comparatively simple configuration without providing wiring between a radiation source and a radiation imaging apparatus to thereby obtain a radiation image with extremely good quality.

Further features of the present invention will become apparent from the following description of exemplary embodiments with reference to the attached drawings.

DESCRIPTION OF THE EMBODIMENTS

Outline of the Present Invention

Figure 1:
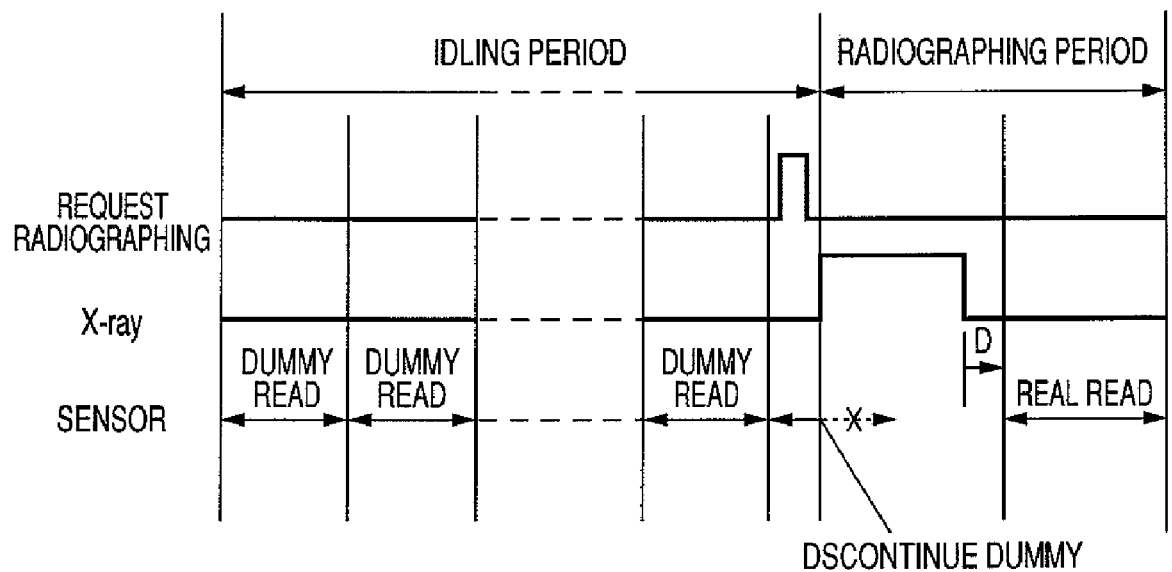
FIG. 1 is a timing chart showing an embodiment 1 of the present.

FIG. 1 is a timing chart on operation in an X-imaging apparatus of the present invention of an embodiment 1 of the present. An idling period refers to a period for making it ready for a radiation (X-ray) imaging element (sensor) to carry out radiographing during radiographing period. During that period, the radiographing element is repeating dummy read operation being the second read operation. Dummy read operation refers to operation of reading a dark current component flowing out without a stop in the radiographing element. The dummy read operation removes the dark current component. In particular, an idling period starts immediately after a bias is given to the radiographing element and therefore the dark current component gets large. Normally that dummy read operation is repeated several times to several tens of times for stabilizing the dark current. During the idling period, a signal for outputting an X-ray, that is, an imaging demanding signal is given by a photographer who operates an X-ray source (generally a radiographer) and thereafter an X-ray is outputted.

Figure 2:
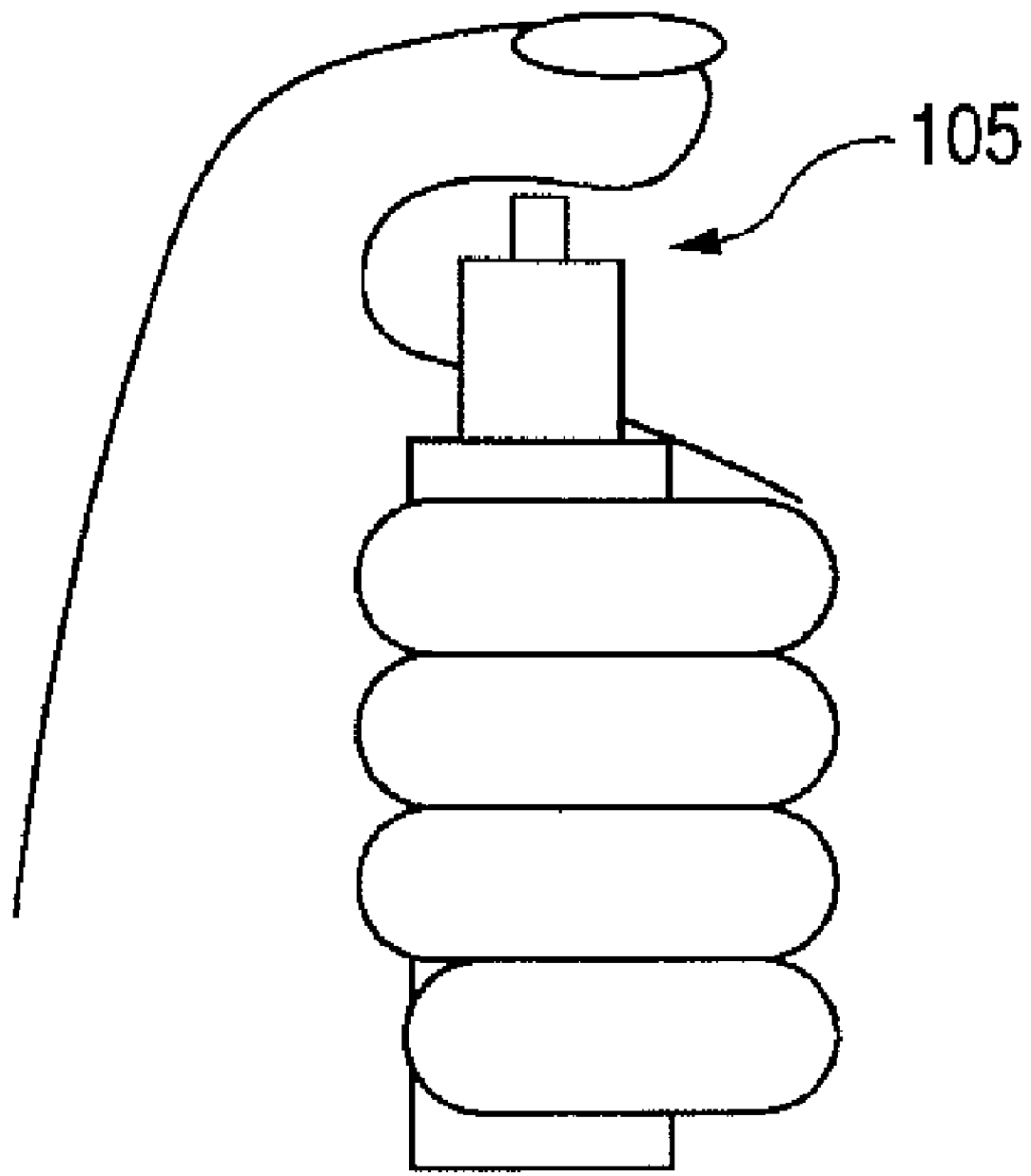
FIG. 2 is a schematic diagram of an irradiation button in an X-ray generator.

Timing of occurrence of signal of requesting radiographing by a radiographing person is, as shown in FIG. 2, operation based on an intention of the radiographing person generally by pushing down an irradiation button with a finger and therefore is not synchronized with dummy read operation of a sensor which repeats operation sequence in a constant interval.

In the present invention, as shown in FIG. 1, the dummy read operation is stopped in synchronization with a start of X-ray irradiation from the X-ray source, and thereafter, transits to a radiographing that real read operation being the first read operation is executed. In the prior arts, upon receipt of radiographing demand, dummy read operation going on at that point of time is caused to complete one session of scanning and thereafter irradiation of an X-ray starts and therefore delay takes place from an occurrence of an irradiation demand by the time when an X-ray is outputted, giving rise to such an problem to lose a radiographing chance. In addition, in order to control the sequence for generating X-rays, it is necessary to bring an X-ray source and a radiation imaging apparatus into connection by electric wiring. In contrast, in the present invention, an X-ray detector is provided to start X-ray irradiation and thereby dummy operation is controlled to discontinue so that there is no particular need to bring the X-ray source and the radiation imaging apparatus into electrical connection by wiring.

In addition, the start of irradiation coincides with transition from idling period to radiographing and the finish of X-ray irradiation is detected to start real read operation and therefore it is possible to shorten delay time from an occurrence of irradiation request up to outputting.

As shown in reference character 'D' in FIG. 1, the delay time may be provided between the finish of X-ray irradiation and the start of real read operation in consideration of optical response property of a radiographing element. Of course, in the case where no optical response property and the like are present, detection of the finish of X-ray irradiation may by carried out without setting any delay time so that the real read time starts immediately thereafter. Specific embodiments where the present invention is applied Respective embodiments of the present invention will be described with reference to the drawings.

Embodiment 1

Figure 3:
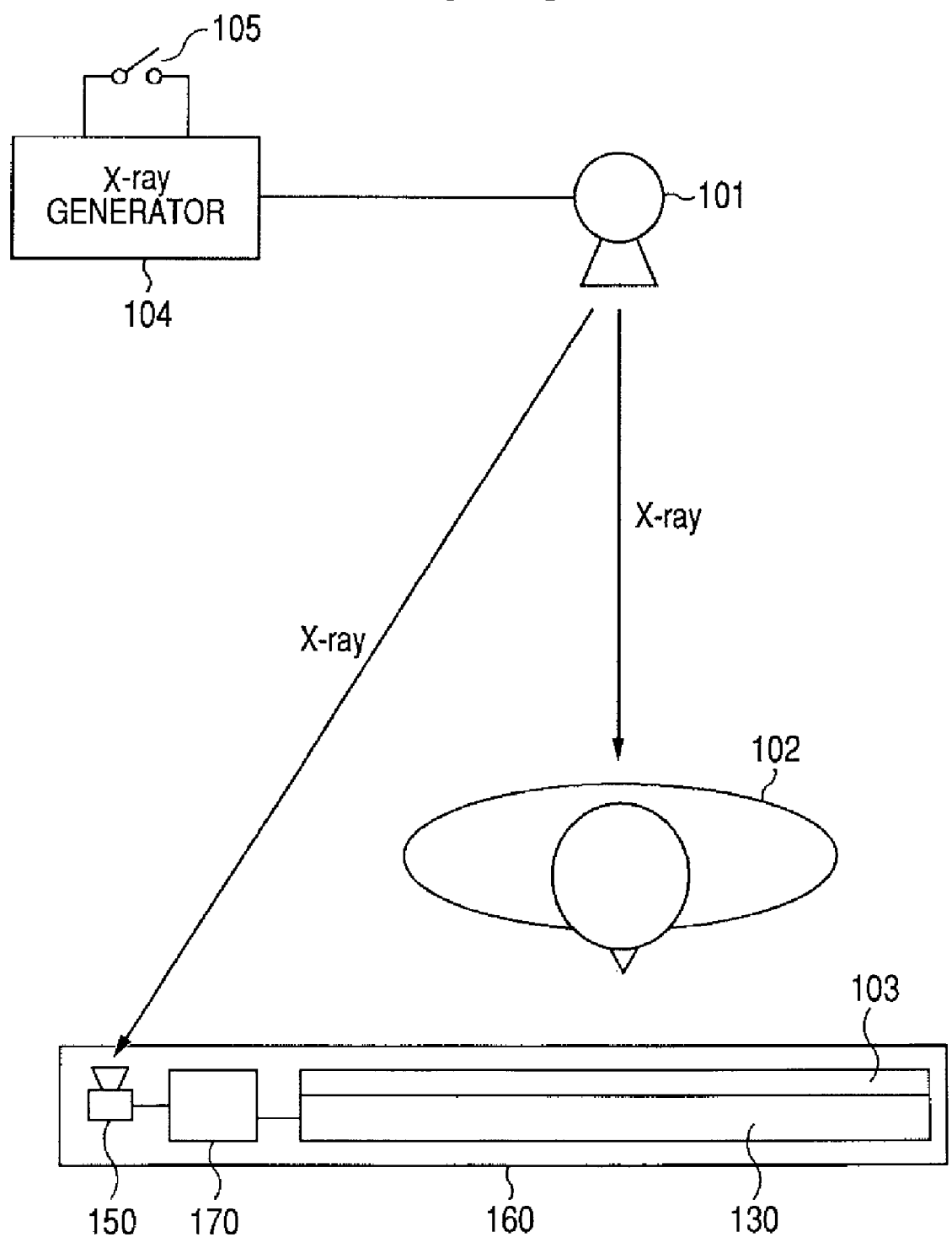
FIG. 3 is a conceptual diagram of an X-ray imaging system showing the embodiment 1 of the present invention.

FIG. 3 is a schematic diagram schematically showing an X-ray imaging system according to an embodiment 1 of the present invention. In FIG. 3, reference numeral 101 denotes an X-ray source for outputting an X-ray; reference numeral 104 denotes an X-ray generator for generating an X-ray outputted from the X-ray source 101; and reference numeral 105 denotes a switch (an irradiation button) for controlling X-ray irradiation with which a radiographer and the like carry out opening/closing operation and is shaped as shown in FIG. 2. Reference numeral 103 denotes a phosphor which functions as a wavelength converter for converting an X-ray permeating an object 102 into light such as visible light and the like. Reference numeral 130 denotes an imaging apparatus mainly configured by a conversion circuit unit, a driving circuit unit and a signal processing circuit unit. The conversion circuit unit comprises a plurality of photoelectric conversion elements, which convert light converted with the phosphor 103 into an electric signal, being arranged in a matrix. The driving circuit unit drives the conversion circuit unit. The processing circuit unit reads electric signals out of the conversion circuit unit. The phosphor 103 is also called as an X-ray imaging apparatus in combination of the phosphor 103 and the imaging apparatus 130.

Reference numeral 150 denotes an X-ray detecting circuit for detecting presence (the start of irradiation and the finish of irradiation) of X-ray irradiation from the X-ray source 101. Reference numeral 170 denotes a controlling unit that comprises a built-in drive circuit to drive the imaging apparatus 130 in a various modes responsive to a detection result of the X-ray detecting circuit 150 and controls the drive circuit. Reference numeral 160 denotes a chassis on which the phosphor 103, the X-ray circuit unit 130, a controller 170 to be described below and the X-ray detecting element 150 are mounted and is made of metal selected from the group consisting of aluminum, stainless and the like that that are susceptible of X-ray permeation without difficulty.

In addition, the phosphor 103 comprises a main component selected from the group consisting of $Gd_2O_2S$, $Gd_2O_3$, CsI and the like and contains a slight amount of illumination cores selected from the group consisting of Tb (terbium), Tl (thallium) and the like. Specifically, $Gd_2O_2S$:Tb, CsI:Tl and the like. The phosphor 103 converts the X-ray having permeated the object 102 into visible light corresponding with the level amount level of X-ray permeation amount. The converted light is transmitted to the side of the X-ray circuit unit 130 and converted into an electric signal. This electric signal corresponds to an X-ray permeated image of the object 102.

Here, in FIG. 3, the X-ray imaging apparatus is by a conversion (circuit) unit in combination of the phosphor 103 being a wavelength converter and the imaging apparatus 130 comprising a plurality of photoelectric conversion but the present invention will not be limited thereto. It is also preferable to configure an imaging apparatus in use of an X-ray conversion element of a direct conversion type, which absorbs radiation to directly convert it into an electric signal, instead of a photoelectric conversion element in the conversion (circuit) unit without using a wavelength converter. This X-ray conversion element is configured, as the main component, a single kind of material selected from the group consisting of lead iodide, mercuric iodide, selenium, cadmium telluride, gallium arsenide, zinc sulfide and silicon, for example.

Here, for convenience in expression, FIG. 3 depicts as if the X-ray outputted from the X-ray source 101 directly irradiates the X-ray detecting circuit 150 but it occasionally irradiates the X-ray detecting circuit 150, which is disposed in the vicinity of the imaging apparatus 130, through the object 102.

The X-ray outputted from the X-ray source 101 is irradiated to the object 102 and the X-ray detecting circuit 150 respectively and the X-ray having permeated through the object 102 reaches the phosphor 103. When an X-ray is inputted, the X-ray detecting circuit 150 detects that the X-ray is outputted from the X-ray source 101 and then outputs a signal notifying an occurrence thereof to the controller 170.

The controller 170 controls respective operation of the conversion circuit unit, drive circuit unit and the processing circuit unit being main components of the imaging apparatus 130. The controller 170 carries out dummy read operation and real read operation selectively. And, when the start of X-ray irradiation is detected by the X-ray detecting circuit 150, the dummy read operation of the conversion circuit unit during the idling operation period discontinues in response thereto and transits to a radiographing period. During the radiographing period, when the finish of X-ray irradiation is detected by the X-ray detecting circuit 150, the real read operation of the conversion circuit unit (sensor) in response thereto. Dummy read operation and real read operation will be detailed below.

Figure 4:
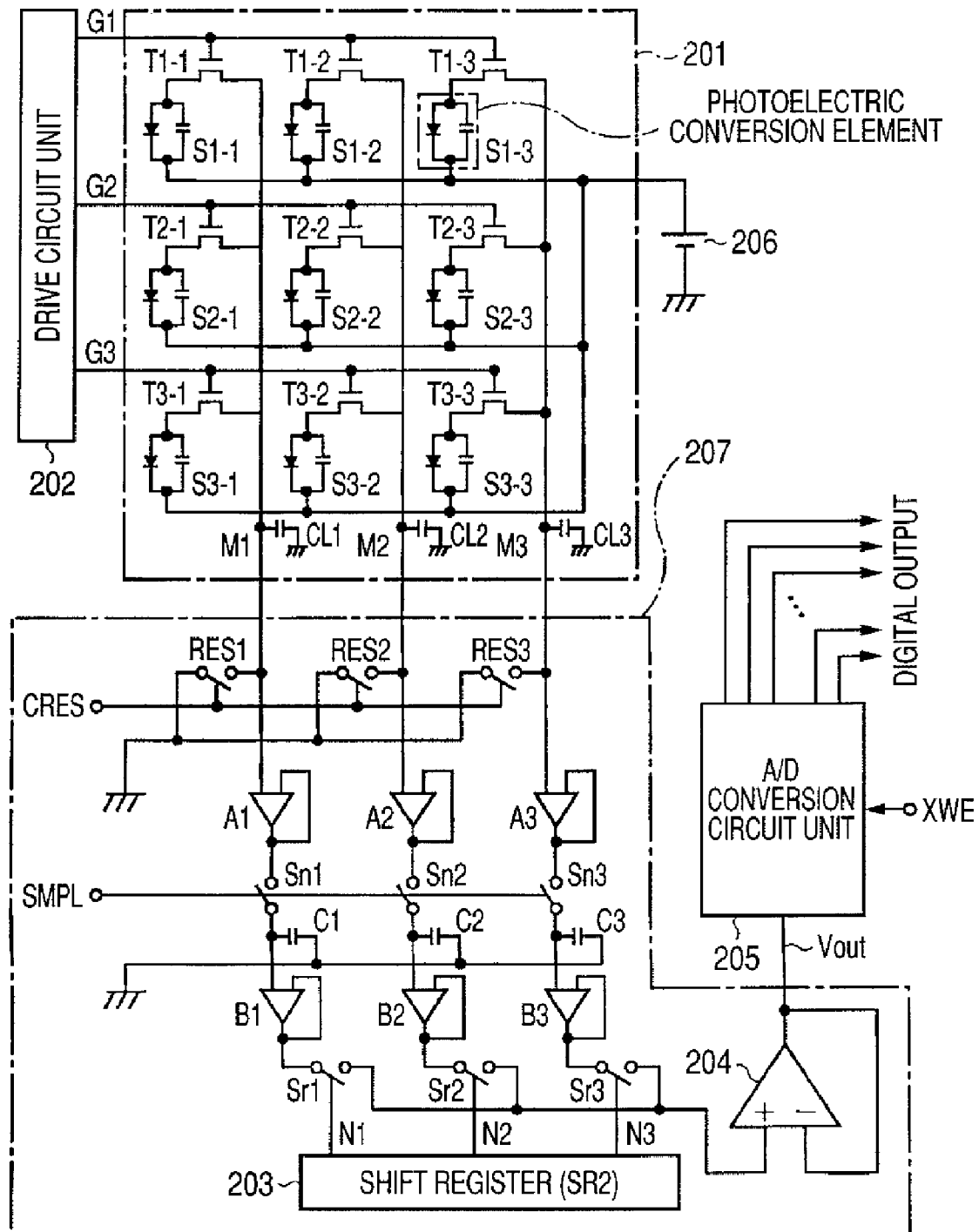
FIG. 4 is a circuit diagram of the X-ray circuit unit of FIG. 3 and its periphery.

FIG. 4 is a circuit diagram of the imaging apparatus 130 of FIG. 3 and its periphery. Here, a two-dimensional arrangement of photoelectric conversion elements will be described as an example. Here, in order to simplify the description, FIG. 4 comprises 3×3 or 9 pixels in total but, actually, photoelectric conversion elements in such a number to correspond with a required sensor size are arranged. For example, in case of a chest region X-ray imaging apparatus for medial use, the arrangement is carried out in an effective area of not less than 40 cm and with pixels of not less than 2000×2000 in pixel pitch of 200 μm.

In addition, reference numerals and characters denote S1-1 to S3-3 photoelectric conversion elements for receiving visible light convert this into an electric signal. Reference numerals and characters T1-1 to T3-3 denote switches for transferring electric charges having undergone photoelectric conversion with photoelectric conversion elements S1-1 to S3-3 to the side of matrix signal wiring M1 to M3. In the present embodiment, a single pixel is configured by a single photoelectric conversion element and a single switch element. Reference numerals and characters G1 to G3 denote drive wiring for gate drive of the switches connected to the switch elements T1-1 to T3-3.

The matrix signal wiring M1 is equivalent to addition of capacitance for three units of inter-electrode capacitance (Cgs) of a switch element equivalent at the time of the finish of transfer and FIG. 4 depicts that as capacitance element CL1. The other case of the matrix signal wiring M2 and M3 are likewise and are indicated as CL2 and C13.

The photoelectric conversion elements S1-1 to S3-3, the switching elements T1-1 to T3-3, drive wiring G1 to G3 and matrix signal wiring M1 to M3 are provided to configure the conversion circuit unit 201, which is disposed on a desired insulating substrate. FIG. 4 does not depict the insulating substrate. The drive circuit unit 202 comprising a shift register (SR1) carries out ON/OFF drive control over the switch elements T1-1 to T3-3.

Light inputted to the photoelectric conversion elements S1-1 to S3-3 is converted into electric signals there and accumulated in the respective inter-electrode capacitance. These electric signals will become voltage outputs in parallel through transfer switches T1-1 to T3-3 and the signal wiring M1 to M3.

Moreover, the processing circuit unit 207 will derive signals in series which are outputted to an A/D conversion circuit unit 205 being an analog/digital converter and are converted from analog signals into digital signals there. The photoelectric conversion apparatus in FIG. 4 divides the photoelectric conversion elements with total pixel number of 9 bits into three rows in a set. The above described respective operation will be carried out sequentially on a row unit basis.

Figure 5:
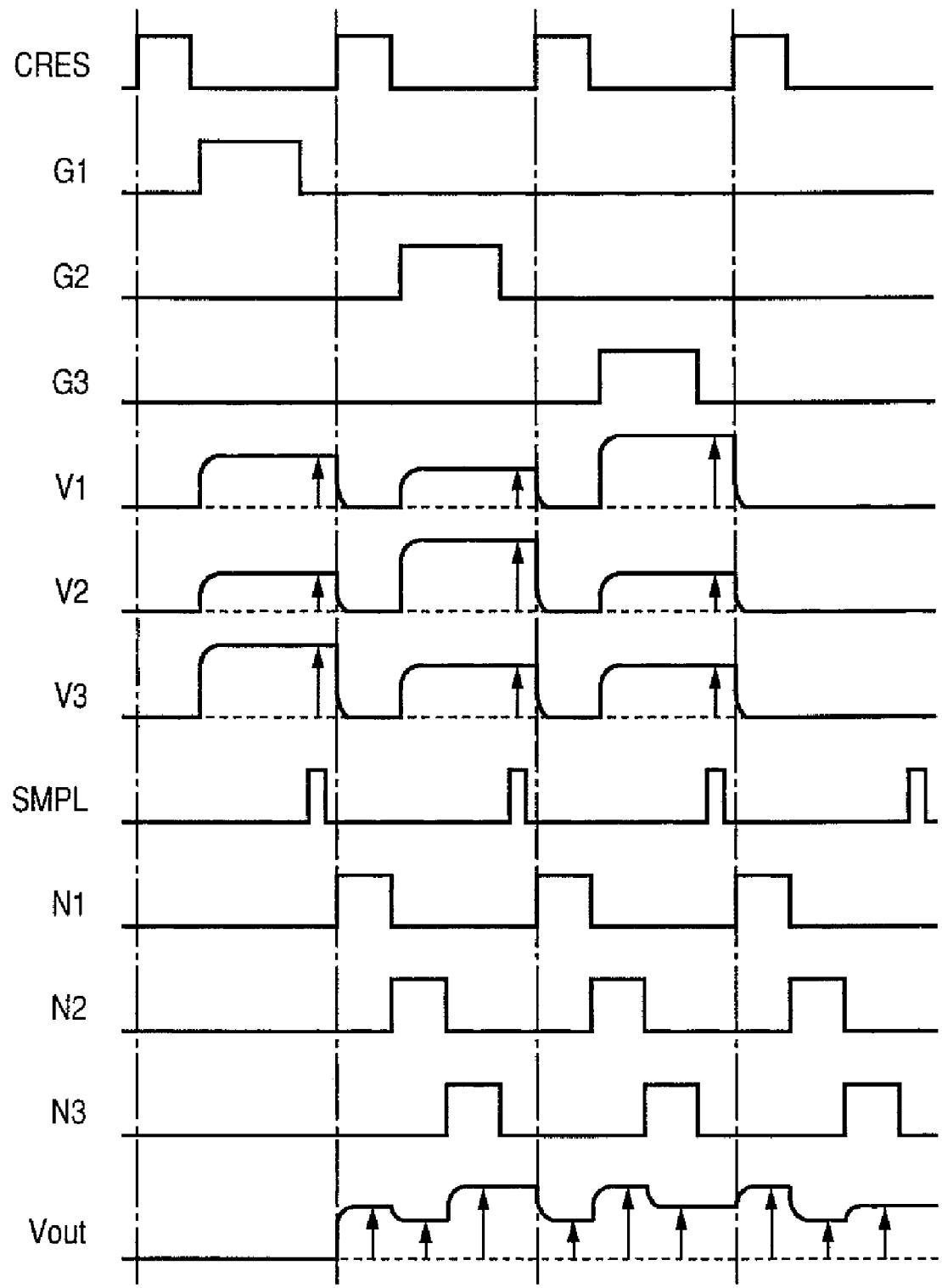
FIG. 5 is a timing chart showing operation of the X-ray circuit unit shown in FIG. 4.

FIG. 5 is a timing chart showing operation of the imaging apparatus 130 shown in FIG. 4. The light inputted to the first row of the photoelectric conversion elements S1-1 to S1-3 is converted into an electric signal which is accumulated into the respective inter-electrode capacitance. After a constant accumulation period has elapsed, voltage pulse (drive signal) for transfer is outputted from the drive circuit unit 202 to the drive wiring G1 to switch the transfer switch elements T1-1 to T1-3 into an ON state.

On that switching, charges accumulated in an inter-electrode capacitance inside photoelectric conversion elements S1-1 to S1-3 are transferred to capacitance CL1 to CL3 respectively formed with the matrix signal wiring M1 to M3. This transfer will increase potentials V1 to V3 of the inter-electrode capacitance CL1 to CL3 by charges covering the signals (transfer operation).

Next, turning ON the SMPL signal, the signals in the capacitance CL1 to CL3 are transferred to sample hold capacitance C1 to C3 inside the processing circuit unit 207. At that time, the signals of the capacitance CL1 to CL3 are amplified by amplifiers A1 to A3 respectively.

Turning OFF the SMPL signal, the charges of the sample hold capacitance C1 to C3 are held. After the SMPL signals are turned OFF, the capacitance CL1 to CL3 is reset with a CRES signal so that transfer operation of the next row will be carried out.

The signal of the first row of sample hold capacitance C1 to C3 having undergone sample hold causes the shift register (SR2) 203 to provide voltage pulse sequentially so as to switch read switches Sr1 to Sr3 into the ON state sequentially. The operation hereof converts the signals into signals in series through amplifiers B1 to B3; brings signals covering three pixels into digital conversion with the A/D conversion circuit unit 205 after impedance conversion with an operational amplifier 204; and outputs them outside of the radiation imaging apparatus.

Subsequently, drive signals are applied into drive wiring G2 and G3 sequentially by the drive circuit unit 202 and thereby the above described operation is repeated so that data of the entire pixels are outputted. Signals having undergone photoelectric conversion covering three rows are read out repeatedly.

In FIG. 4 and FIG. 5, coverage over 9 pixels is indicated but operation is likewise for greater number of pixels. Provision of sample hold capacitance C1 to C3 makes it possible to carry out the read operation of the n-th row and transfer the operation of the n+1-th row during the same period.

Next, dummy read operation and real read operation will be described. There is no difference in the dummy read operation and the real read operation between operation of photoelectric conversion elements described with FIG. 4 and FIG. 5. That is, there is no change in operation of the conversion circuit unit 201, the processing circuit unit 207 and the drive circuit unit 202. As a difference between the dummy read and the real read, operation for obtaining image data required for collecting X-ray image information is called real read operation while operation for reading image data lacking X-ray image information is called dummy read.

In other words, real read operation prior to irradiation of X-rays is called dummy read operation while read operation after irradiation of X-ray is taken as real read operation. Dummy read operation is operation is operation of repeating read operation for a plurality of times during an idling period being stages for making X-ray radiographing ready. Here, the wording 'read operation' is used for convenience, but this only depends on application of the same operation as real read operation with the drive circuit unit 202 and the processing circuit unit 207 and it will not be intended to read data configuring an X-ray image.

For example, an XWE signal is inputted to the A/D conversion circuit unit 205 which converts an analog signal in FIG. 4 into a digital signal. This XWE signal is a signal selecting whether or not to cause the A/D conversion function to operate and, in case of causing the A/D function to operate, a "Lo" signal is inputted so that digital data are outputted. In case of not causing the A/D function to operate, a "Hi" signal is inputted so that no digital data are outputted. In addition, in case of causing no A/D function to operate, there is a method of saving power by causing the A/D conversion circuit unit not to operate. For example, in case of the dummy read operation, the XWE signal is switched to "Hi" while the XWE signal is switched to "Lo" in case of the real read operation.

Figure 6:
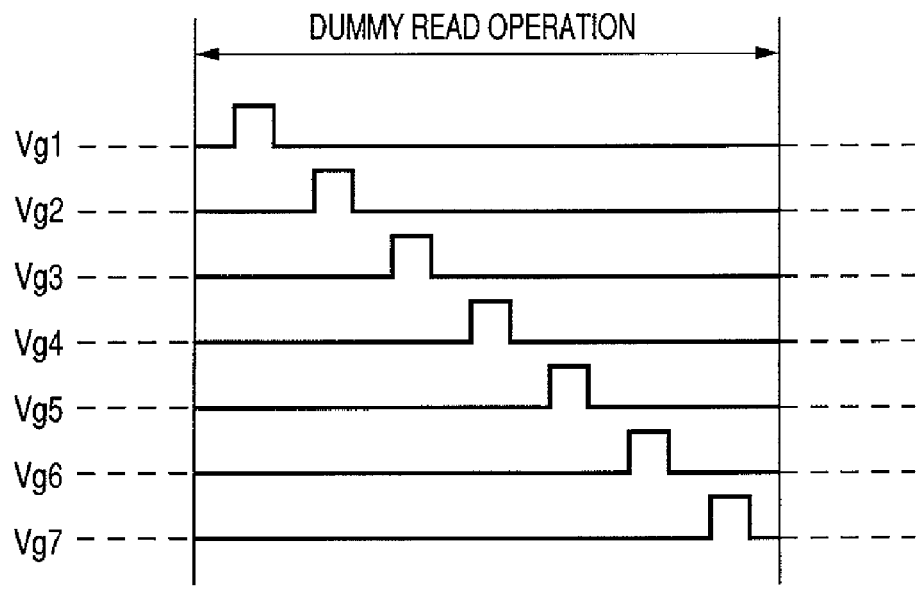
FIG. 6 is a timing chart of a driving circuit unit (shift register) in dummy read operation during an idling period before starting X-ray irradiation.

FIG. 6 is a timing chart of a driving circuit unit (shift register) in dummy read operation during an idling period before starting X-ray irradiation. In FIG. 6, drive wiring for simplifying the description is described to cover seven lines. During an idling period, the drive signals are outputted in an equal interval.

Figure 7:
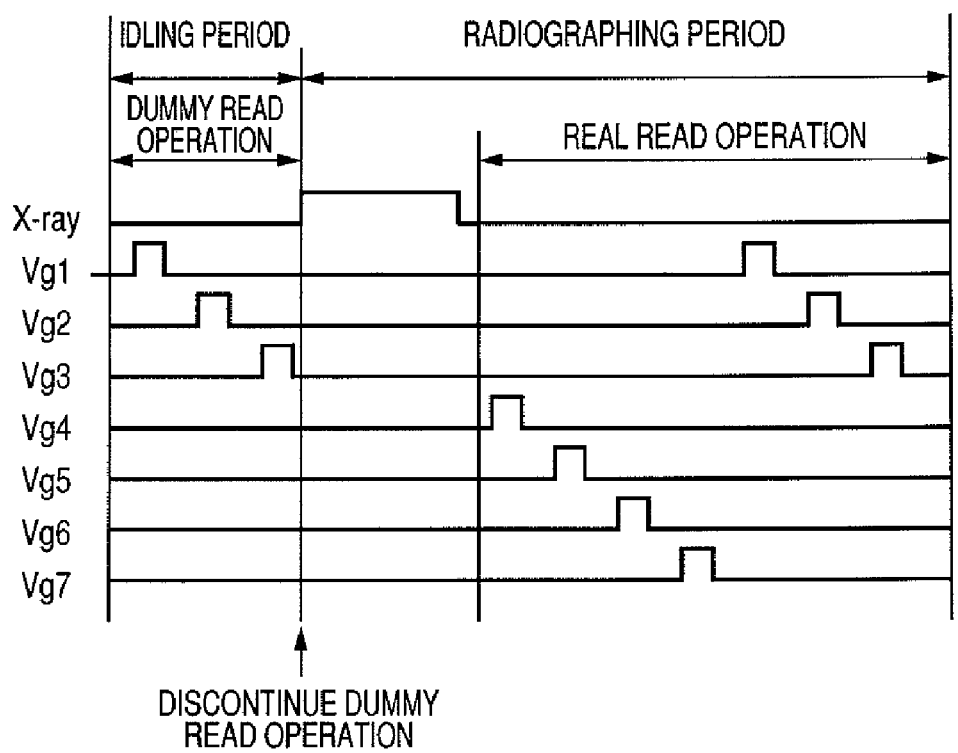
FIG. 7 is a timing chart in the case where an X-ray is irradiated in the midst of dummy read operation during an idling period.

FIG. 7 is a timing chart in the case where an X-ray is irradiated in the midst of dummy read operation during an idling period. In FIG. 7, X-ray irradiation starts after a drive signal (Vg3) is outputted to the third drive wiring. In that stage, no drive signal (Vg4) is outputted with normal timing to the fourth drive wiring so that the dummy read operation discontinues. After X-ray irradiation finishes, the drive signal (Vg4) is outputted to the fourth drive wiring. That stage is no longer dummy read but image information by an X-ray is contained and is treated as real read operation. After the drive signal (Vg7) is outputted to the drive wiring of the last seventh drive wiring, the drive signals (Vg1 to Vg3) are outputted to the drive wiring allocated from the first line to the third line in the likewise sequence so that the signal output of the drive circuit unit for the real read operation finishes.

Figure 8:
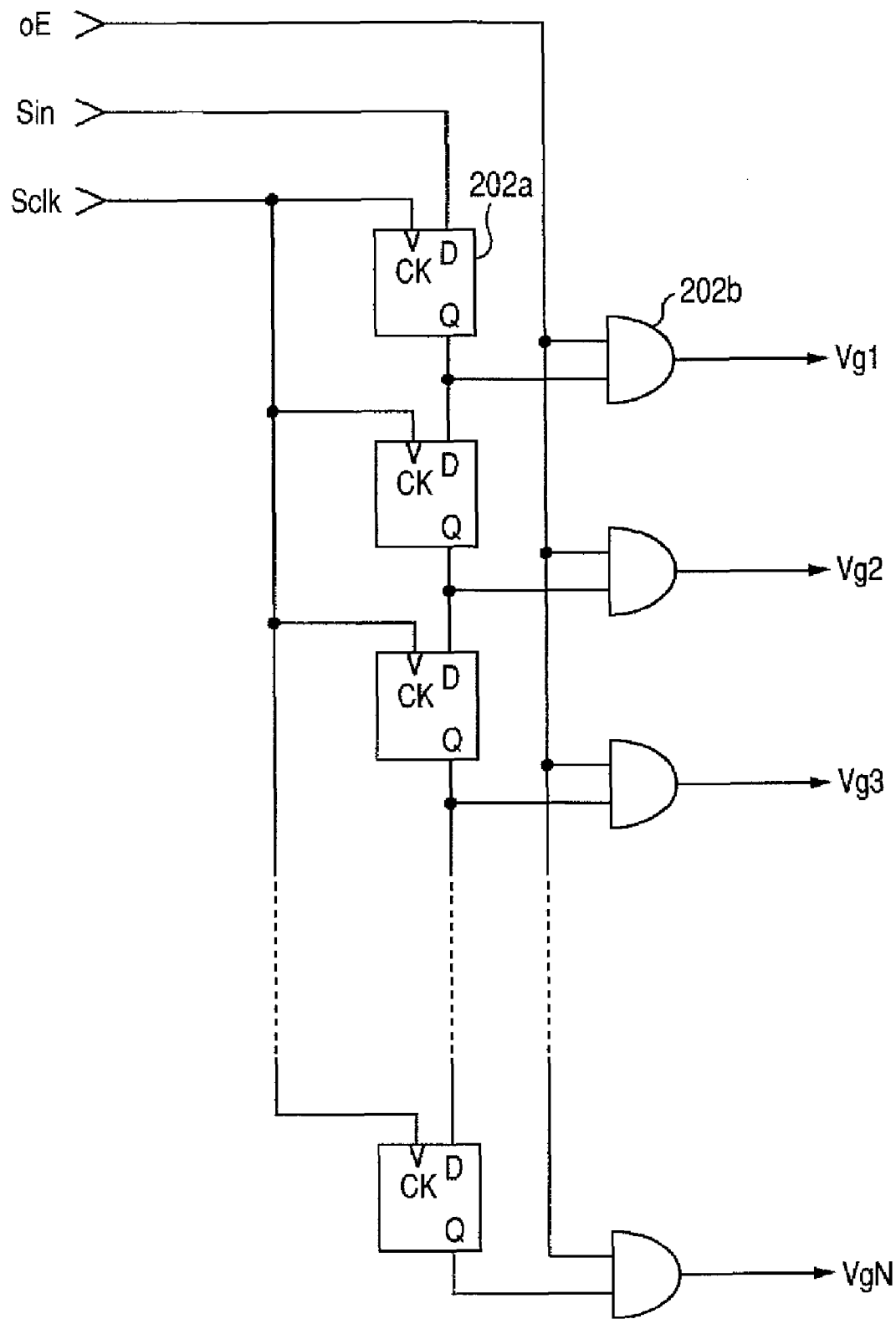
FIG. 8 is a circuit diagram showing an example of a configuration of the driving circuit unit (shift register) in FIG. 4.

FIG. 8 is a circuit diagram showing an example of a configuration of the driving circuit unit 202 comprising a shift register in FIG. 4. The drive circuit unit 202 is configured in combination of a predetermined number of flip-flop circuits 202a and AND circuits 202b, and drive signals Vg1 to VgN are outputted from the corresponding AND circuit 202b to drive wiring G1 to GN (G1 to G3 in the example in FIG. 4).

As having been described above, in the present embodiment, operation of providing the subsequent drive wiring with a drive signal is stopped in the case where the start of X-ray irradiation has been detected by an X-ray detecting circuit when the ON state of the drive signal to the midway drive wiring has been finished during dummy read operation during an idling period. And after the finish of X-ray irradiation has been detected by the X-ray detecting circuit, a drive signal is given from the stopped drive wiring to start real read operation so that real read operation to reach the preceding wiring is carried out. According to the present embodiment, an artifact in an X-ray image to be obtained will be prevented form occurring an X-ray image with extremely good quality will become obtainable without providing any wiring between the X-ray source 101 and the X-ray imaging apparatus but with comparatively simple configuration.

Specifically, since it requires approximately no time from radiographing with a radiographer and the like to display of image, no patient will be caused to wait but burden to patients are alleviated. In addition, the number of patient who can undergo radiographing during a day increases so as to improve workflow in a hospital. In addition, for the drive of the X-ray generator 104 and the X-ray circuit unit 130, it is possible to delete electric wiring for carrying out synchronization on timing. This is advantageous that an X-ray image can be provided easily if there is an X-ray source without employing a great number of kinds of X-ray source with different manufacturers and formats or any complicated interfaces.

In particular, this is advantageous that a light and thin type X-ray imaging apparatus such as a complete film cassette without connecting to another appliance if a battery and a memory are mounted on the photoelectric conversion apparatus in its inside. This makes it simple to dispose an X-ray imaging apparatus to a patient easily so as to make radiographing activity simple since no wiring is present in case of radiographing seriously injured patients, elder patients and the like. In future, use as an X-ray imaging apparatus for configuring an X-ray imaging system so that radiographing is feasible inside a narrow vehicle as in case of conveying a wounded person who is placed inside an ambulance.

In addition, according to the present embodiment, read data of "real read operation" are read in such a state that no light is irradiated to an switch element and therefore, giving rise to, therefore, such an effect that no artifact due to TFT leak or optical response current and the like is caused to occur in an X-ray image.

That is, the present embodiment does not require no wiring to be provided between the radiation source and the radiation imaging apparatus side but gives rise to such an effect that a light and thin type radiation imaging apparatus and system obtaining an X-ray image with good quality lacking any artifact are providable. Here, the present embodiment has been described with dummy read and real read but the present invention will not be limited thereto. For example, after read operation, dark output read operation of acquiring dark output of the conversion circuit unit 201 may be carried out with operation of conversion circuit unit 201, processing circuit unit 207 and drive circuit unit 202 likewise dummy read operation or real read operation.

Embodiment 2

Figure 9:
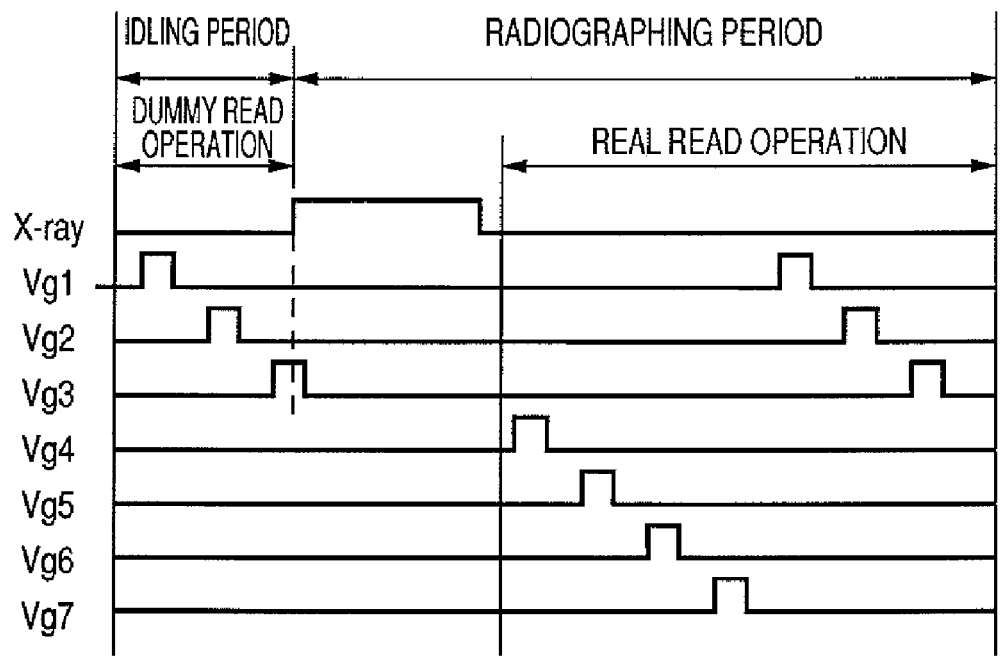
FIG. 9, which shows an embodiment 2 of the present invention, is a timing chart in the case where irradiation of an X-ray is started while a driving signal is in an ON state.

FIG. 9 is a timing chart in the case where irradiation of an X-ray is started while a driving signal is in an ON state and is a drawing for showing an embodiment 2 of the present invention.

In FIG. 9, X-ray irradiation starts in the midst when a drive signal Vg3 is in the ON state. In the present embodiment, the drive signal Vg4 starts operation as real read operation with pulse width and timing likewise in FIG. 7 with no change after X-ray irradiation has finished. In this case, the X-ray image information portion of the portion where the drive signal Vg3 is stacked onto X-ray irradiation will be lost from the image of the drive signal Vg3. However, if X-ray irradiation period is set to sufficiently long period compared with the pulse width of the drive signal, the error amount thereof is small to an ignorable extent. Nevertheless, in the case where horizontally striped artifact is formed on an X-ray image to be obtained later, this is easily correctable by multiplying the corresponding signal (Vg3) with a coefficient.

As having been described above, in the present embodiment, operation of providing the subsequent drive wiring with a drive signal is stopped in the case where the start of X-ray irradiation has been detected by an X-ray detecting circuit when the drive signal is being provided to the midway drive wiring during dummy read operation during an idling period. And after the finish of X-ray irradiation has been detected by the X-ray detecting circuit, a drive signal is given from the stopped drive wiring to start real read operation so that real read operation to reach the preceding drive wiring is carried out.

Embodiment 3

Figure 10:
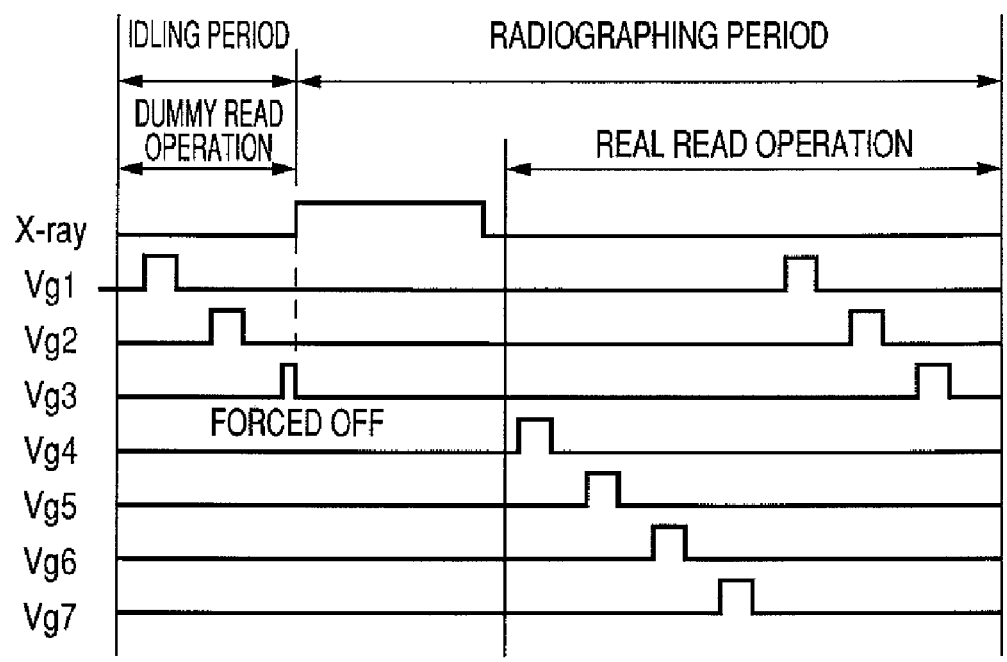
FIG. 10, which shows an embodiment 3 of the present invention, is a timing chart in the case where irradiation of an X-ray is started while a driving signal is in an ON state.

FIG. 10 is a timing chart in the case where irradiation of an X-ray is started while a driving signal is in an ON state and is a drawing showing an embodiment 3 of the present invention. In FIG. 10, X-ray irradiation starts in the midst when a drive signal Vg3 is in the ON state. In the present embodiment, the dive signal Vg3 is forced OFF approximately at the same time with the start of X-ray irradiation. That method can be attained easily by tuning the OE signal OFF in FIG. 8, for example. The drive signal Vg4 starts operation as real read operation with timing likewise in FIG. 7. In case of the present embodiment, the portion where the drive signal Vg3 is stacked onto X-ray irradiation is extremely little and the loss of X-ray image information observed in embodiment 2 will never take place.

As having been described above, in the present embodiment, operation of providing that drive wiring with a drive signal is stopped in the case where the start of X-ray irradiation has been detected by an X-ray detecting circuit when the drive signal is being provided to the midway drive wiring during dummy read operation during an idling period. And after the finish of X-ray irradiation has been detected by the X-ray detecting circuit, a drive signal is given from the stopped drive wiring's subsequent drive wiring to start real read operation so that real read operation to reach the stopped drive wiring is carried out.

Embodiment 4

Figure 11:
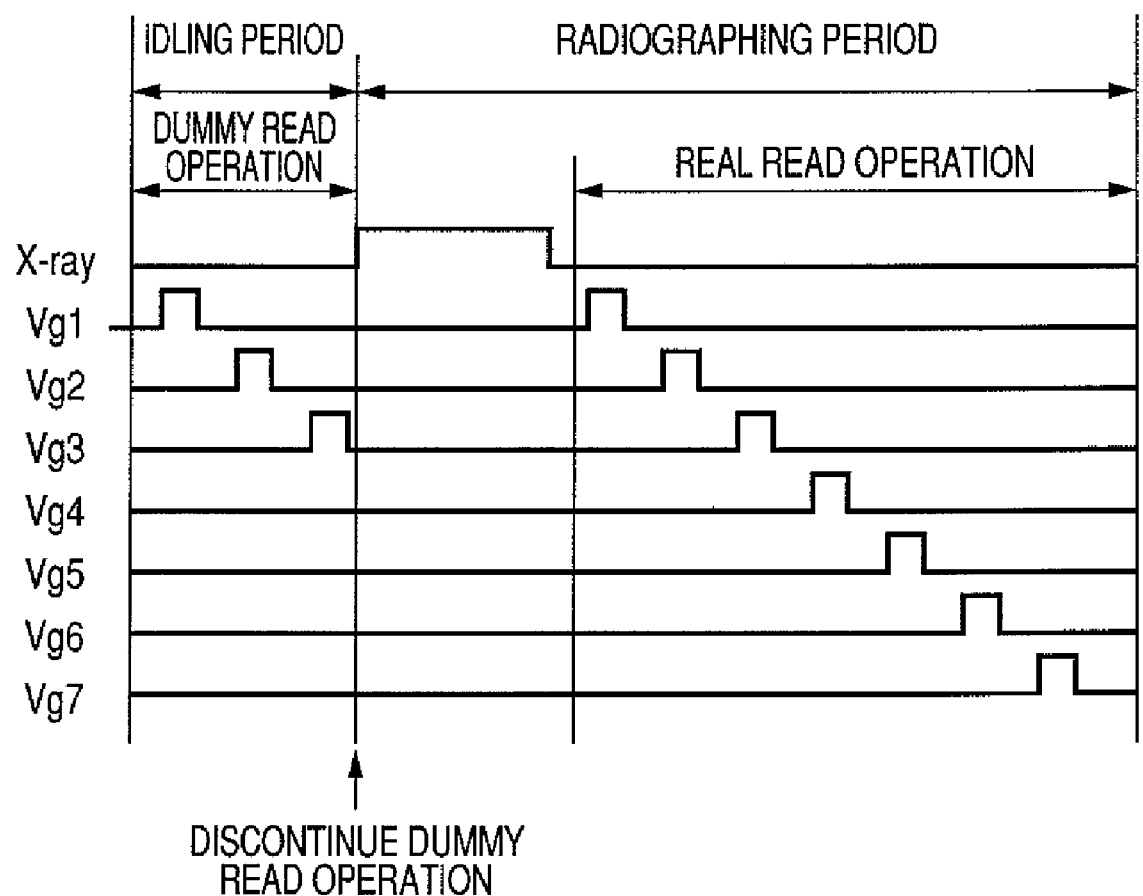
FIG. 11, which shows an embodiment 4 of the present invention, is a timing chart in the case where an X-ray is irradiated during dummy read operation within a period of idling operation.

FIG. 11 is a timing chart showing an embodiment 4 of the present invention and is a drawing showing the embodiment 4 of the present invention. This timing chart exemplifies the case where an X-ray is irradiated during dummy read operation within a period of idling operation. In FIG. 11, likewise in FIG. 7, X-ray irradiation starts after a drive signal (Vg3) is outputted to the third drive wiring. In that stage, no drive signal (Vg4) is outputted with normal timing to the fourth drive wiring so that the dummy read operation discontinues. After X-ray irradiation finishes, in FIG. 4, the drive signal (Vg4) is outputted to the fourth drive wiring, but, in FIG. 11 of the present embodiment, the corresponding drive signal is outputted from the drive signal (Vg1) provided to the first drive wiring. Real read operation after X-ray irradiation finishes is no longer dummy read but image information by an X-ray is contained and therefore is treated as real read operation. The drive signal (Vg7) is outputted to the drive wiring of the last seventh drive wiring and then the signal output of the drive circuit unit finishes.

In the present embodiment, the drive circuit unit must be reset during the period after drive signal Vg3 in the dummy read operation is outputted to the output of the drive signal Vg1 in the real read operation (the period when X-ray irradiation lasts). As a method of resetting the drive circuit unit, for example, in case of using, as a drive circuit unit, a shift register as shown in FIG. 8, resetting is attained easily by inputting a great number of pulse rows to the Sclk.

In the present embodiment, operation of providing the subsequent drive wiring with a drive signal is stopped in the case where the start of X-ray irradiation has been detected by an X-ray detecting circuit when the ON state of the drive signal to the midway drive wiring has been finished during dummy read operation during an idling period. And after the finish of X-ray irradiation has been detected by the X-ray detecting circuit, a drive signal is given from the first row drive wiring to start real read operation so that real read operation to reach the last row of drive wiring is carried out. In the present embodiment, real read operation is carried out from the first drive wiring (Vg1), whenever X-ray irradiation starts at any timing, sorting of image data does not take place, giving rise, therefore, to such an advantage that the system can be simplified.

Embodiment 5

Figure 12:
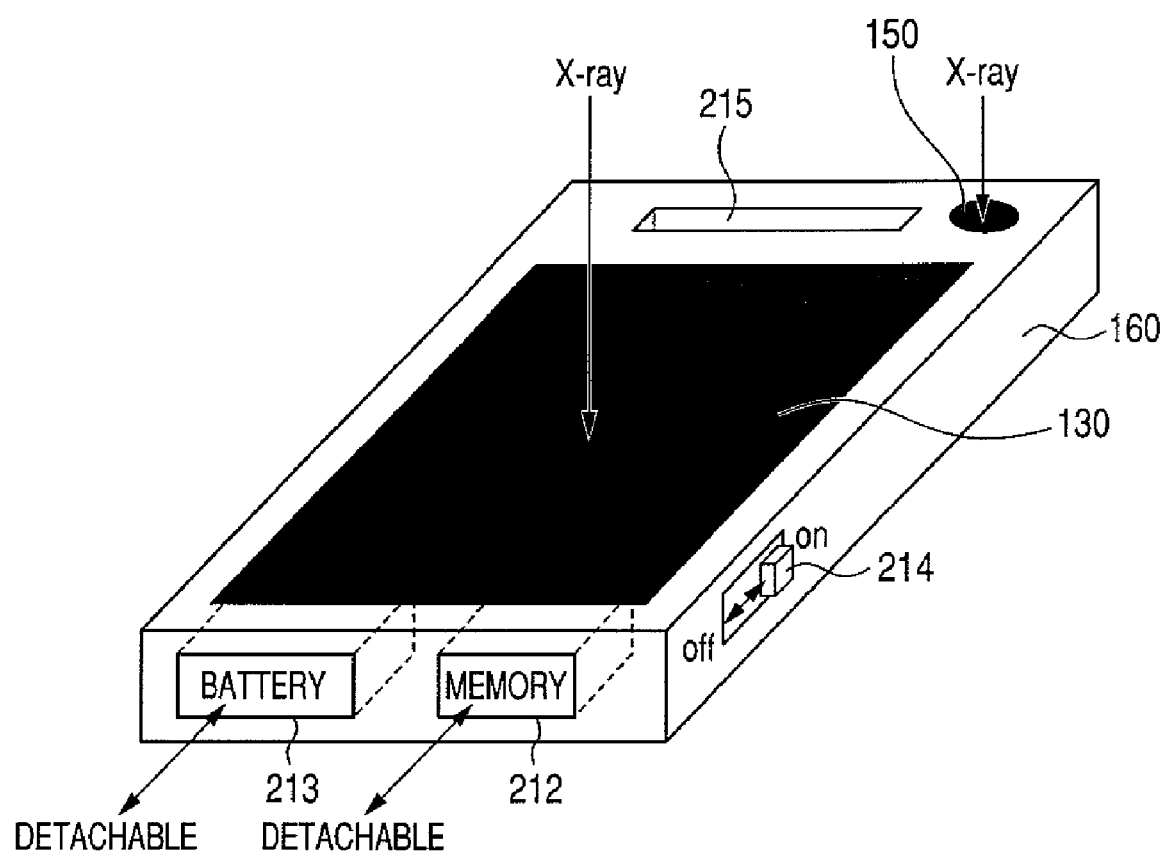
FIG. 12 is a schematic view showing a mechanical summary of the X-ray imaging.
Figure 13:
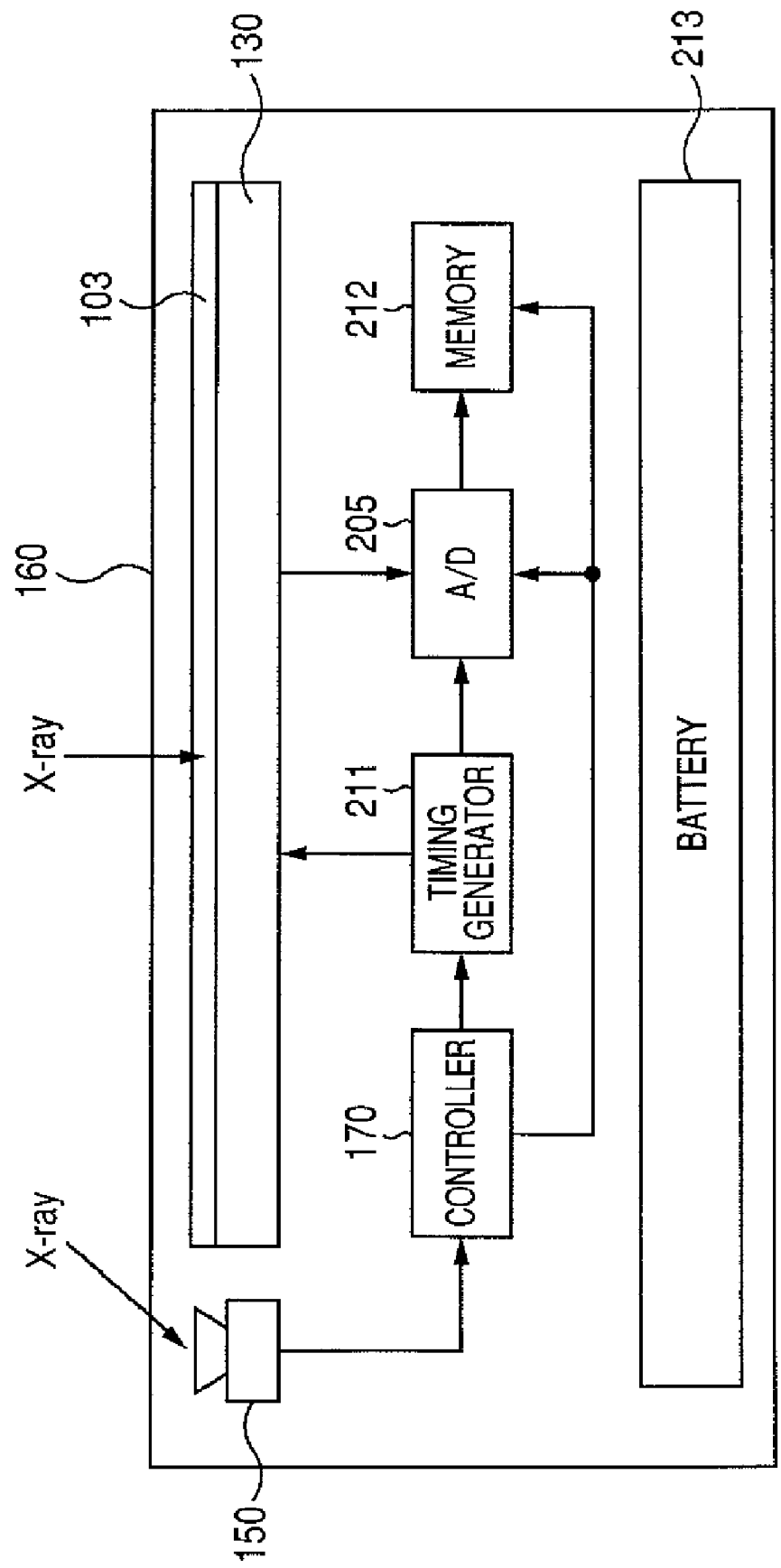
FIG. 13 is a block diagram showing an internal configuration of FIG. 12.

FIG. 12 is a schematic view showing a mechanical summary of the X-ray imaging. FIG. 13 is a block diagram showing an internal configuration of FIG. 12. In FIG. 12 and FIG. 13, reference numeral 211 denotes timing generator being a drive circuit generating clock signals and the like to be inputted into a drive circuit unit 202 comprising a shift register, a shift register 203 and the like; reference numeral 212 denotes a memory for storing digital signals outputted from the A/D conversion circuit unit 205. Reference numeral 213 denotes a battery of the X-ray imaging apparatus; and reference numeral 214 denotes a mechanical starting switch for controlling ON/OFF switching of the main power supply of the X-ray imaging apparatus with a hand of a radiologic technician and the like. Reference numeral 215 denotes a grip used at the time of carrying the X-ray imaging apparatus. Here, like reference numerals and characters designate the same or similar parts shown in FIG. 3 and FIG. 4.

In addition, in the present embodiment, the battery 213 and the memory 212 are configured to be detachably attachable to the A/D function imaging apparatus. In that case, the battery 213 having finished discharging is replaced with a new one or the memory 212 is replaced with a new one when the data accumulation capacitance ready for use in the memory 212 has been fulfilled, and thereby continuous use thereof is made feasible.

Here, any one selected from the group consisting of a hard disk, a magneto-optical disk, a RAM (random access memory), a USB memory easily connectable and detachably attachable to a USB terminal and the like, for example, is assumed as the memory 212. In this relation, in case of adopting a RAM for the memory 212, a power supply such as a button cell is required so that no radiogaphed data disappear. The detached RAM can transfer the radiographing data to a computer through a reader in another machine. A USB memory is detachably attachable to the USB terminal easily so that the data can be photocopied.

Moreover, when the starting switch 214 is in the OFF state, no power activation to the X-ray imaging apparatus takes place and then the switch is turned ON by a hand of a radiologic technician and the like, the imaging apparatus 130 transits to dummy read operation during an idling period. And dummy read is repeated until the X-ray detecting element 150 detects output of an X-ray, and an output of the X-ray is started by a radiologic technician and the like.

When the X-ray detecting element 150 detects the start of the X-ray output, a signal notifying that occurrence is outputted to the controller 210. The controller 210 causes the timing generator 211 to generate a clock signal and the like for driving the imaging apparatus 130 with the drive circuit. The timing generator 211 outputs the generated clock signal and the like to the side of the imaging apparatus 130.

With that output, dummy read operation transits to accumulation operation. And, when the X-ray detecting element detects that the output of X-rays has stopped, the accumulation transits to real read operation. That is, the imaging apparatus 130 outputs analogue signals to the A/D conversion circuit unit 205. The A/D conversion circuit 205 is responsive to an order of the controller 210 to convert those analog signals to digital signals and outputs them to the memory 212. The memory 212 is responsive to an order of the controller 210 to store the outputted digital signals.

And, after the real read operation finishes, a hand of a radiologic technician and the like turns OFF the starting switch 214. In addition, making storage capacitance ready for use for a plurality of frames in the memory 212, the imaging apparatus 130 is caused to transit to dummy read operation after real read operation without turning OFF the starting switch 214 and thereby an X-ray image for the second shot can be radiographed. Repeating this operation, moving picture can be radiographed.

Here, the battery 213 is supplying the X-ray circuit unit 130 inside the chassis 160, the X-ray detecting element 150, the controller 210, the timing generator 211, the A/D conversion circuit unit 205 and the memory 212 with the electric power during the above described operation. And the memory 212 as well as the battery 213 is preferably replaced as described above in accordance with necessity.

Figure 14:
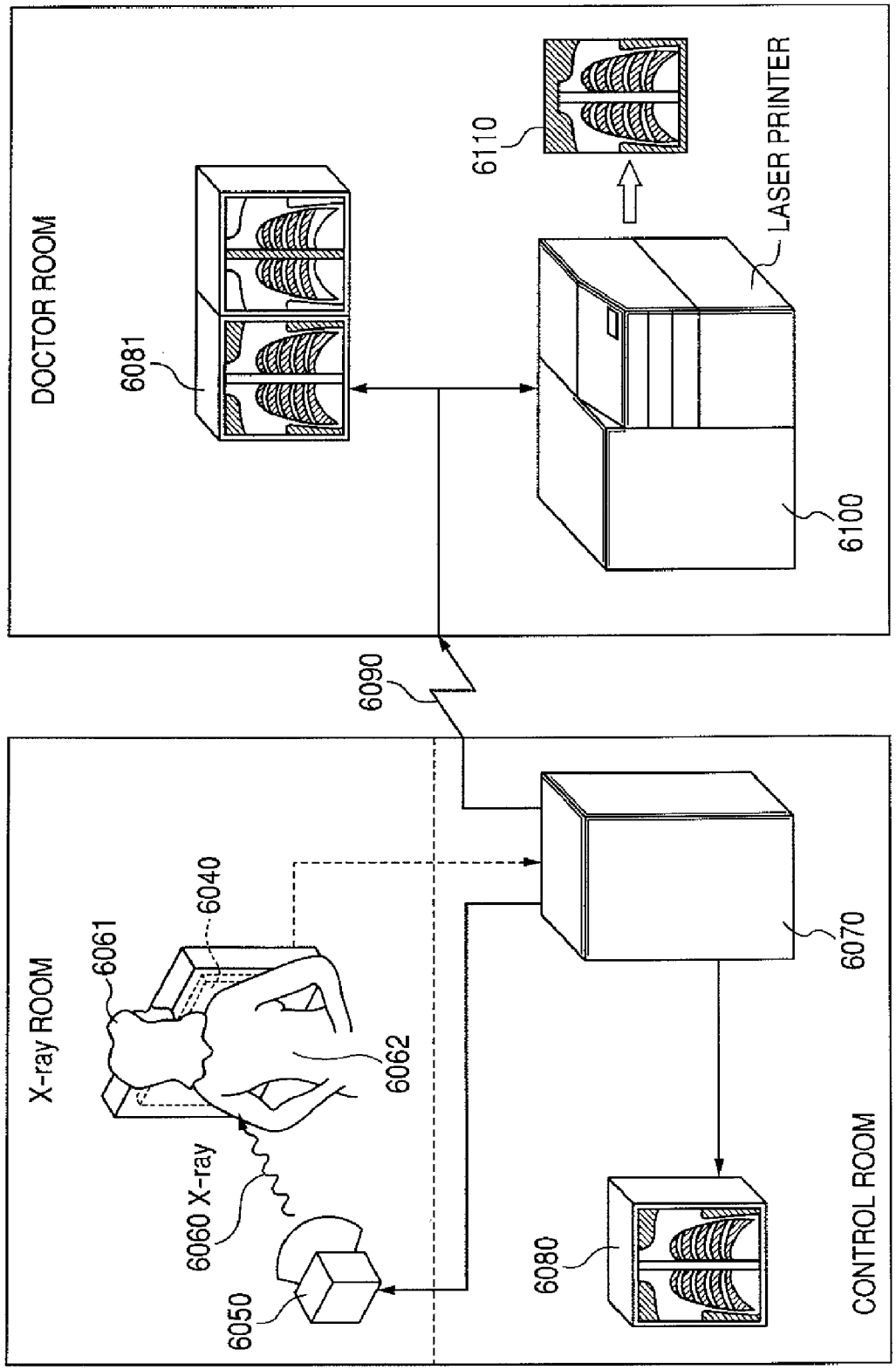
FIG. 14 shows schematically an example of applying the X-ray imaging apparatus in an embodiment 6 of the present invention to X-ray diagnostic system.

FIG. 14 shows schematically an example of applying the X-ray imaging apparatus in an embodiment 4 of the present invention to X-ray diagnostic system.

An X-ray 6060 generated in an X-ray tube (X-ray source) 6050 permeates a chest region 6062 of a patient or an object 6061 and is inputted to a radiation imaging apparatus (image sensor) 6040. This incident X-ray contains information inside the body of the object 6061. Corresponding with entrance of the X-ray, a phosphor converts it into visible light and moreover causes it to undergo photoelectric conversion to obtain electric signals. Those electric signals undergo digital conversion and then image processing with an image processor 6070 and are observed by a display 6080 in a control room.

In addition, that image information can be transferred to a remote site with transmission means such as telephone line 6090 and the like; can be displayed on a display 6081 in another place such as a doctor room or be stored in a storage means such as an optical disk and the like so that a doctor in a remote site can carry out diagnosis. In addition, that image information can be stored in film 6110 by a film processor 6100.

Application of the Present Invention to other Embodiments

Functions of respective components (controller 170 and the like) configuring an X-ray imaging system according to the above described respective embodiments can be realized by operating a program stored in a RAM, a ROM and the like of a built-in computer in the relevant X-ray imaging system. Likewise the procedures of X-ray imaging methods described in use of FIG. 1, FIG. 5, FIG. 6, FIG. 7, FIG. 9, FIG. 10, FIG. 11 and the like can be realized by operating programs stored in the RAM, the ROM and the like of a computer. The present invention includes computer readable storage medium having recorded this program and the relevant program.

Specifically, the above described program is recorded in recording medium selected from the group consisting of CD-ROM and the like, for example or is mediated by respective kinds of transmission media, and is provided to the computer. A recording medium of recording the above described program selected from the group consisting of a hard disk, a magnetic tape, a magneto-optical disk, a nonvolatile memory card, a memory stick and the like besides a CD-ROM is usable. On the other hand, as transmission medium of the above described program, a communication medium in a computer network system for transmitting program information to supply as a carrier can be used. Here, a computer network is selected from the group consisting of wireless communication network, WAN selected from the group consisting of LAN, the Internet and the like and the like; and a communication medium is selected from the group consisting of wireless circuit, wired circuit selected from the group consisting of optical fiber and the like and the like.

In addition, the program included in the present invention is not limited to only the one where the functions of the above described embodiments are realized by a computer carrying out the supplied programs. For example, also in the case where the functions of the above described embodiments are realized in cooperation with an OS (operating system), in which that program is in operation in a computer, or the other application software and the like, such programs are included in the present invention. In addition, also in the case where all or a part of processing of the supplied program is carried out by a function extension board or a function extension unit of a computer to realize functions of the above described embodiments, such a program is included in the present invention.

Figure 15:
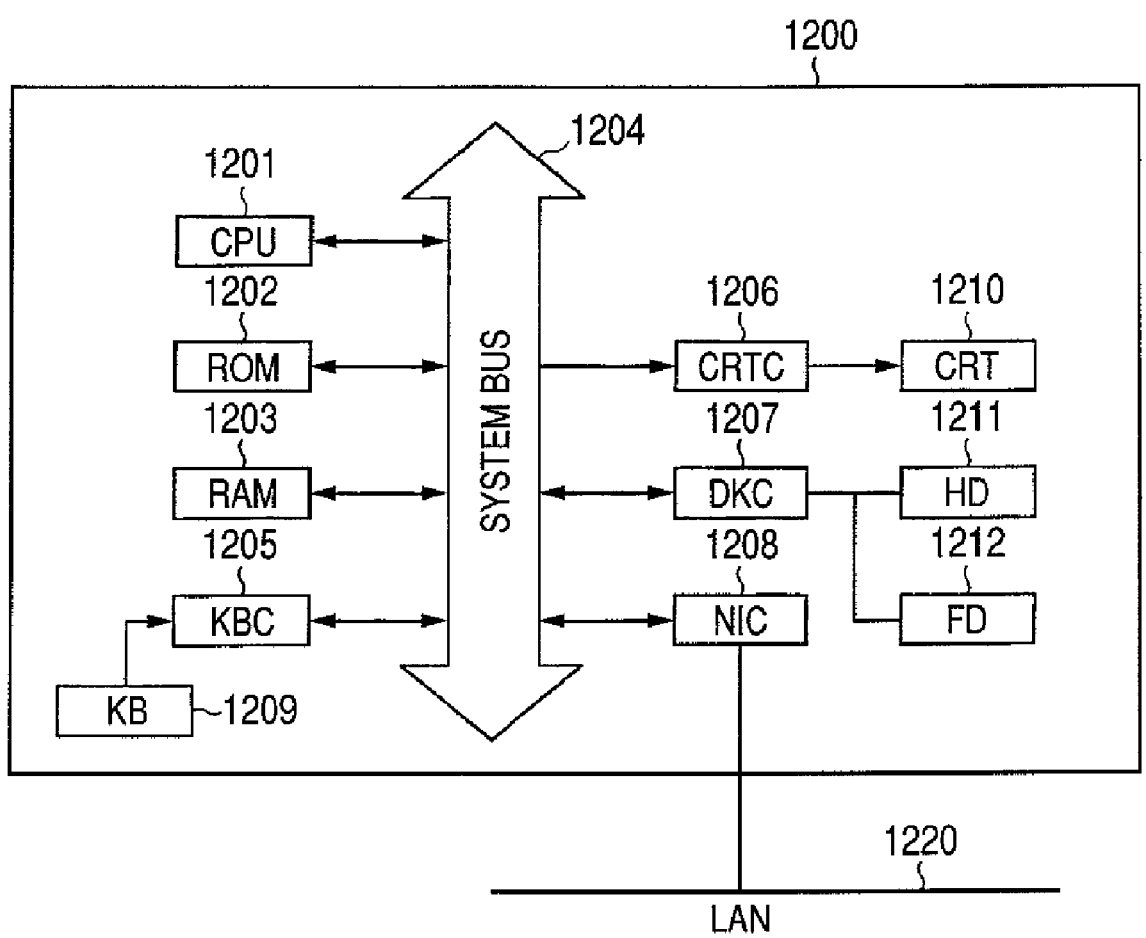
FIG. 15 is a schematic view showing an internal configuration of a built-in computer of an X-ray imaging system.
Figure 16:
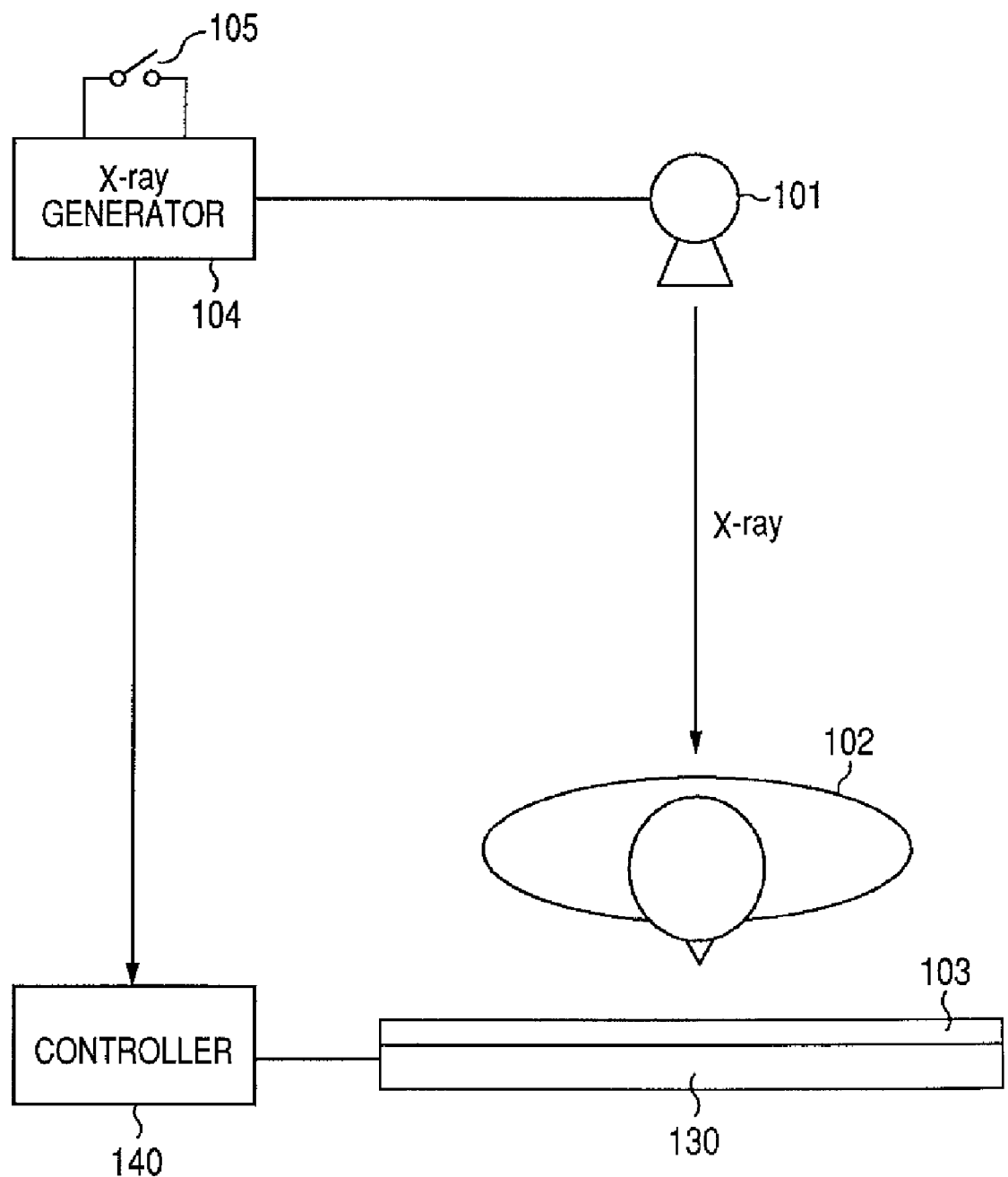
FIG. 16 is a block diagram showing a schematic configuration of an X-ray imaging system of a conventional digital system.

For example, FIG. 15 is a schematic diagram showing an interior configuration of a personal user terminal apparatus. In this FIG. 15, reference numeral 1200 denotes a personal computer (PC) comprising a CPU 1201. The PC 1200 carries out device control software stored in a ROM 1202 or a hard disk (HD) 1211 or supplied by flexible disk drive (FD) 1212. That PC 1200 controls, as a whole, respective devices connected to a system bus 1204.

Respective procedures and the like of the X-ray imaging method of embodiments 1 to 6 are realized by the program stored in the CPU 1201, the ROM 1202 or the hard disk (HD) 1211 of the PC 1200.

Reference numeral 1203 denotes a RAM which functions as a main memory, a work area and the like of the CPU 1201. Reference numeral 1205 denotes a keyboard controller (KBC) which controls instruction input from a keyboard (KB) 1209, a device and the like not shown in the drawing.

Reference numeral 1206 denotes a CRT controller (CRTC) which controls display of a CRT display (CRT) 1210. Reference numeral 1207 denotes a disk controller (DKC). The DKC 1207 controls access to the flexible disk (FD) 1212 and the hard disk (HD) 1211 storing those selected from the group consisting of a boot program, a plurality of applications, editing files, user files, network managing programs and the like. Here a boot program refers to a start-up program: a program starting execution of hardware and software of a personal computer.

Reference numeral 1208 denotes a network interface card (NIC) which exchanges data with a network printer, the other network appliances or the other PC bilaterally through LAN 1220.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-349879, filed Dec. 2, 2005, which is hereby incorporated by reference herein in its entirety.

What is claimed is:

1. A radiation imaging apparatus comprising:
   a conversion unit wherein a plurality of conversion elements for converting radiation into an electric signal are arranged in rows and columns;
   a drive circuit unit for driving said conversion unit;
   a signal processing circuit unit for reading the electric signal from said conversion unit;
   a radiation detecting unit for detecting irradiation or non-irradiation of said radiation; and
   a controller for controlling operation of said drive circuit unit and operation of said signal processing circuit unit,
   wherein said controller selectively carries out a first read operation of reading an electric signal based on the radiation from said conversion unit and a second read operation of reading an electric signal not based on the radiation from said conversion unit, and
   controls operation of said drive circuit unit and said signal processing circuit unit such that, when the irradiation of the radiation is detected by said radiation detecting unit during the second read operation, the second read operation is stopped, and when the non-irradiation of the radiation is detected by said radiation detecting unit, the first read operation is started.

2. The radiation imaging apparatus according to claim 1, wherein said controller controls operation of said drive circuit unit and said signal processing circuit unit so as to start the first read operation by selecting said drive circuit unit of a predetermined row when said first read operation is carried out after the second read operation discontinues.

3. The radiation imaging apparatus according to claim 2, wherein each said conversion element comprises a wavelength converter for converting the radiation into light and a photoelectric conversion element for converting the light into the electric signal.

4. The radiation imaging apparatus according to claim 2, wherein said controller controls operation of said drive circuit unit and said signal processing circuit unit so as to start the first read operation from said conversion element of the row where the second read operation discontinues when the first read operation is carried out after the second read operation discontinues.

5. The radiation imaging apparatus according to claim 2, wherein said controller controls operation of said drive circuit unit and said signal processing circuit unit so as to start the first read operation from a conversion element of a subsequent row relative to the row where the second read operation discontinues when the first read operation is carried out after the second read operation discontinues.

6. The radiation imaging apparatus according to claim 2, wherein said controller controls operation of said drive circuit unit and said signal processing circuit unit so as to start the first read operation from said conversion element of a top row when the first read operation is carried out after the second read operation discontinues.

7. The radiation imaging apparatus according to claim 1, further comprising an analog-to-digital converter for converting the electric signal, output as an analog signal by said signal processing circuit unit, into a digital electric signal and a memory for storing the digital electric signal.

8. A radiation imaging system comprising a radiation source and the radiation imaging apparatus according to claim 1 for imaging based on radiation irradiated from said radiation source.

9. A method of controlling a radiation imaging apparatus comprising:
a first step of reading, prior to irradiation with radiation, a converter wherein a plurality of conversion elements for converting a radiation into an electric signal are arranged along rows and columns, an electric signal from the converter with a drive circuit unit for driving the converter and a signal processing circuit unit for reading the electric signal from the converter;
a second step wherein, when a radiation detecting unit for detecting irradiation or non-irradiation of the radiation detects the irradiation of the radiation, performance of the first step is stopped by the drive circuit unit and the signal processing circuit unit; and
a third step wherein, when the radiation detecting unit for detecting irradiation or non-irradiation of the radiation detects the non-irradiation of the radiation, reading an electric signal based on said radiation from the converter is conducted by the drive circuit unit and the signal processing circuit unit.

10. A computer-readable recording medium encoding, in executable form, a program for causing a computer to perform a process of making radiation imaging of converting a radiation into an electric signal with a converter wherein a plurality of conversion elements are arranged along rows and columns of a radiation imaging apparatus, wherein
said program executes, selectively a first reading operation of reading the electric signal out to a signal processing circuit unit provided in the radiation imaging apparatus by driving the converter by a drive circuit unit provided in the radiation imaging apparatus in a case in which irradiation of radiation is detected by a radiation detecting unit provided in the radiation imaging apparatus, and a second read operation of reading an electric signal out to the signal processing circuit unit by driving the converter by the drive circuit unit in a case in which non-irradiation of the radiation is detected by the radiation detecting unit, such that,
during the second read operation, when the radiation detecting unit detects the irradiation of radiation, the radiation imaging apparatus stops the second read operation; and
after the discontinuing of the second read operation, responsive to detecting non-irradiation of the radiation by the radiation detecting unit, the radiation imaging apparatus operates to start the first read operation.

* * * * *